M. HANELINE.
Nut Lock.

No. 234,277.  Patented Nov. 9, 1880.

Witnesses:
C. Clarence Poole
A. G. Heyhmmy

Inventor:
Martin Haneline
by-
Attorney

United States Patent Office.

MARTIN HANELINE, OF JOPLIN, MISSOURI.

NUT-LOCK.

SPECIFICATION forming part of Letters Patent No. 234,277, dated November 9, 1880.

Application filed February 7, 1880.

*To all whom it may concern:*

Be it known that I, MARTIN HANELINE, a citizen of the United States, residing at Joplin, in the county of Jasper and State of Missouri, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
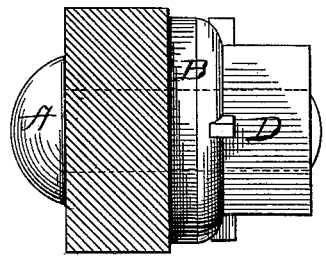
Figure 2:
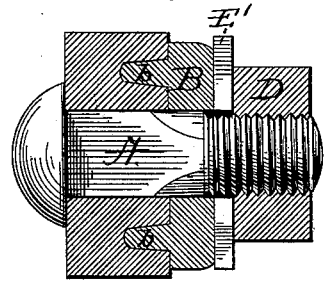
Figure 3:
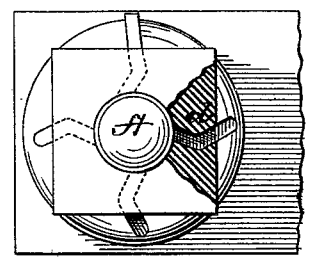
Figure 4:
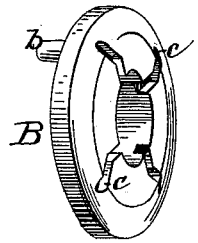
Figure 5:
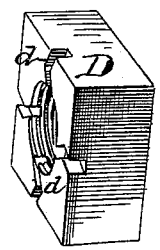
Figure 6:
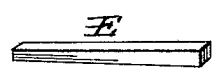
Figure 7:

Figure 1 is a side view of my improved nut-lock in connection with a piece of timber. Fig. 2 is a sectional view of the same. Fig. 3 is a front view of the nut and washer partially broken away to show the curved groove more fully. Fig. 4 is a perspective view of the washer. Fig. 5 is a perspective view of the nut. Fig. 6 are views of the locking-key. Fig. 7 shows the old style of locking nuts on bolts.

This improvement relates to that class of railroad-rail bolts, washers, and nuts in which locking-pins are inserted in the grooves in the washers and nuts.

The object of the present improvement is to connect the nut and washer of the bolt as against becoming loosened by continued shocks or jars of the rolling-stock.

Heretofore the washers and nuts of bolts have been provided with straight grooves, as shown in Fig. 7 of the drawings, so that when brought together the grooves would coincide to receive a locking-pin.

This construction of a nut-lock is objectionable for several reasons, among which may be stated, first, that the locking-pin, if slightly small, in being driven home to secure a lock comes in contact with the screw-threads of the bolt, thereby marring and injuring the same; second, that the jarring of the rolling-stock over the rails will in a short time loosen the straight pins or keys and cause them to fly out, which gives freedom for the nut to work off.

The main object of my invention is to overcome this serious difficulty; and the improvement consists in the combination, with a bolt, of a washer and a nut provided with grooves that are curved or otherwise deflected from a right line to receive a locking pin or key, as will be hereinafter more fully set forth, and pointed out in the claim.

In the annexed drawings, forming a part of this specification, the letter A represents a bolt having the usual square shoulder and screw-threads. This bolt is designed to pass through a railroad-rail and fish-plates arranged on opposite sides of the rail. (Not shown in the drawings.)

The drawings simply show a fish-bar provided with a rectangular opening for the passage of the bolt, as shown in Fig. 2 of the drawings. The washer B is formed on one side with the projections b, which fit into corresponding depressions made in the fish-plate, which forms a firm seat for the washer. This washer is also formed on its face or outer surface with two or more grooves, C, of a shape curved or otherwise deflected from a right line, but preferably of an angular or a zigzag shape, as shown in Fig. 4 of the drawings.

The projections on the inner surface and the curved grooves are formed in the manufacture of the washer, which are usually made by casting, or formed by suitable dies.

The letter D represents a nut adapted to fit on the bolt, and is provided on its inner face with two or more similar-shaped grooves, d, to those of the washer, so that when the washer and nut are brought together they will register, substantially as shown in Fig. 3 of the drawings.

Operation: The bolt is applied to the railroad-rail and its fish-bars in the usual manner. The washer is adjusted over the screw-threaded portion of the bolt brought in contact with the fish-plate, the projections driven into the wooden fish-bar, or into the formed depressions in the metallic fish-bar, so as to prevent the washer from turning upon the bolt. The nut is now applied to the screw-threaded portion of the bolt and screwed home to such an extent that one of its curved grooves will register with a groove in the washer. The straight locking-pin E, (see Fig. 6,) which is made of ductile material, is driven into the registered grooves, and in passing downwardly assumes the bend or shape, as shown by the letter E', thus forming a lock as between the nut and washer, making it impossible to remove the key from its groove by the jarring motion of the rolling-stock. By this construction of the angular grooves in the washer and nut the pin or key receives at the point of bend a bight which securely holds it in position and prevents any possible displacement.

What I claim is—

The combination, with a bolt, of a washer having on its outer face a plurality of grooves, curved or otherwise deflected from a right line, a nut having a plurality of corresponding-shaped grooves, and a locking key or pin that is capable of conforming to the shape of the grooves, substantially as described.

In testimony whereof I affix my signature in presence of two witnesses.

MARTIN HANELINE.

Witnesses:
  LEVI STAUFFER,
  GEORGE W. LYNSDALE.